United States Patent
Toda et al.

(10) Patent No.: US 8,224,331 B2
(45) Date of Patent: Jul. 17, 2012

(54) CELL SEARCH METHOD AND BASE STATION

(75) Inventors: Takeshi Toda, Yokohama (JP); Taku Nakayama, Yokohama (JP); Shingo Joko, Yokohama (JP); Chiharu Yamazaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 339 days.

(21) Appl. No.: 12/443,399

(22) PCT Filed: Sep. 26, 2007

(86) PCT No.: PCT/JP2007/068642
§ 371 (c)(1),
(2), (4) Date: Feb. 23, 2010

(87) PCT Pub. No.: WO2008/041573
PCT Pub. Date: Apr. 10, 2008

(65) Prior Publication Data
US 2010/0159927 A1    Jun. 24, 2010

(30) Foreign Application Priority Data
Sep. 28, 2006   (JP) .................. 2006-265799

(51) Int. Cl.
*H04W 72/00*    (2009.01)

(52) U.S. Cl. ............. 455/441; 455/452.2; 455/439

(58) Field of Classification Search .......... 455/436, 455/435.2, 441, 444, 449, 446, 525, 560, 455/451; 370/328, 338
See application file for complete search history.

(56) References Cited

U.S. PATENT DOCUMENTS

| | | | |
|---|---|---|---|
| 5,239,667 A * | 8/1993 | Kanai | 455/10 |
| 5,548,806 A | 8/1996 | Yamaguchi et al. | |
| 5,854,981 A * | 12/1998 | Wallstedt et al. | 455/439 |
| 2005/0003817 A1 | 1/2005 | Ormson et al. | |
| 2006/0009230 A1 * | 1/2006 | Fukumoto et al. | 455/452.1 |

FOREIGN PATENT DOCUMENTS

| | | |
|---|---|---|
| JP | 2669288 | 8/1994 |
| JP | 2002-027522 | 1/2002 |
| JP | 2003-070055 | 3/2003 |
| JP | 2004-173265 | 6/2004 |
| JP | 2004-349976 | 12/2004 |
| JP | 2006-303739 | 11/2006 |

* cited by examiner

*Primary Examiner* — Kamran Afshar
*Assistant Examiner* — Kenneth Corbin
(74) *Attorney, Agent, or Firm* — DLA Piper LLP (US)

(57) ABSTRACT

The present invention relates to a cell search method for a multiband radio communication system including a mobile station and multiple base stations. The method includes the steps of: classifying base station information into multiple first categories on the basis of a cell size of each base station, the base station information being information on the base stations; classifying the base station information into multiple second categories on the basis of a radio-frequency band of each base station; associating movement speeds with the respective first categories and with the respective second categories; acquiring a movement speed of the mobile station; selecting at least one of the first categories and at least one of the second categories on the basis of the acquired movement speed and the associations between the movement speeds and the respective first and second categories; creating a base station list on the basis of base station information which belongs to the selected first category and base station information which belongs to the selected second category, the base station list being to be notified to the mobile station; notifying the mobile station of the base station list; and causing the mobile station to perform a cell search on the basis of the notified base station list.

8 Claims, 12 Drawing Sheets

FIG. 3

| BASE STATION ID | CELL COVERAGE | FREQUENCY BAND | AREA SEGMENT |
|---|---|---|---|
| BS#1 | 600m | 2.5GHz | URBAN AREA |
| BS#2 | 1500m | 800MHz | RURAL AREA |
| BS#3 | 400m | 2.5GHz | DENSE URBAN AREA |
| ... | ... | ... | ... |

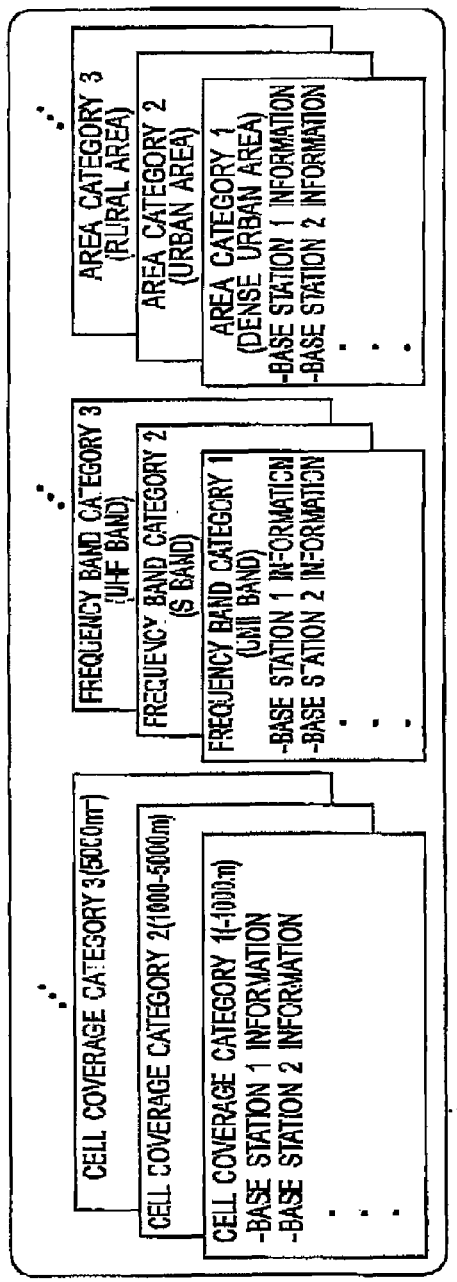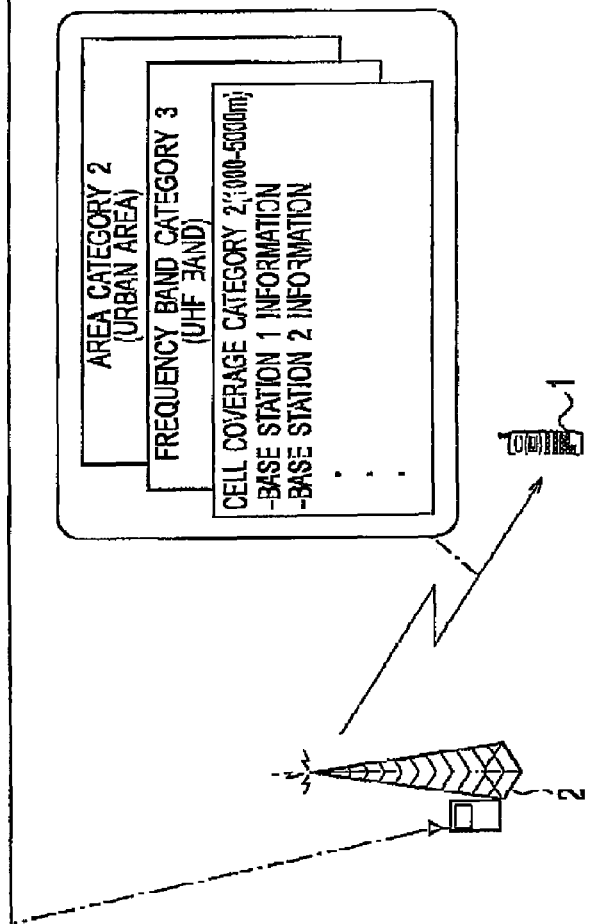
FIG. 6

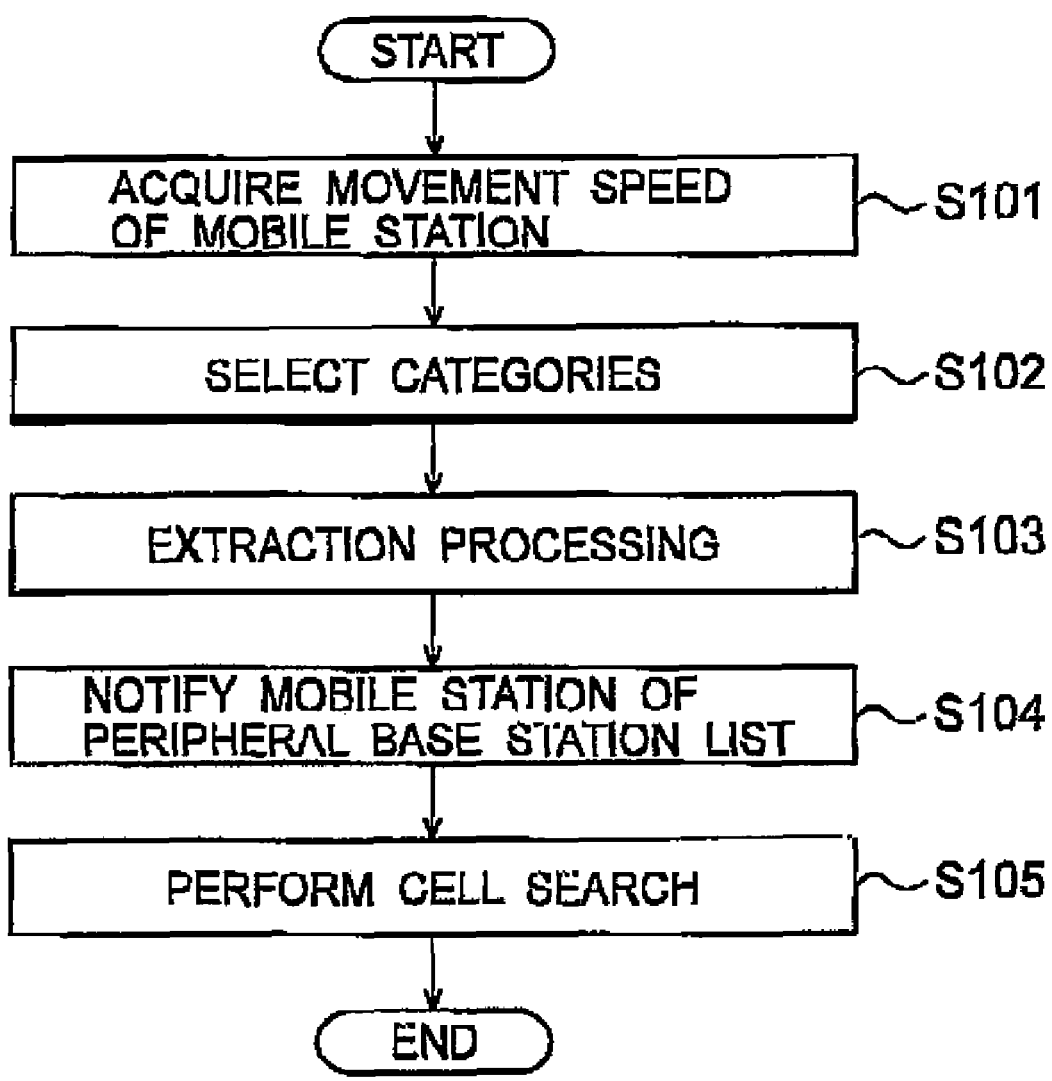

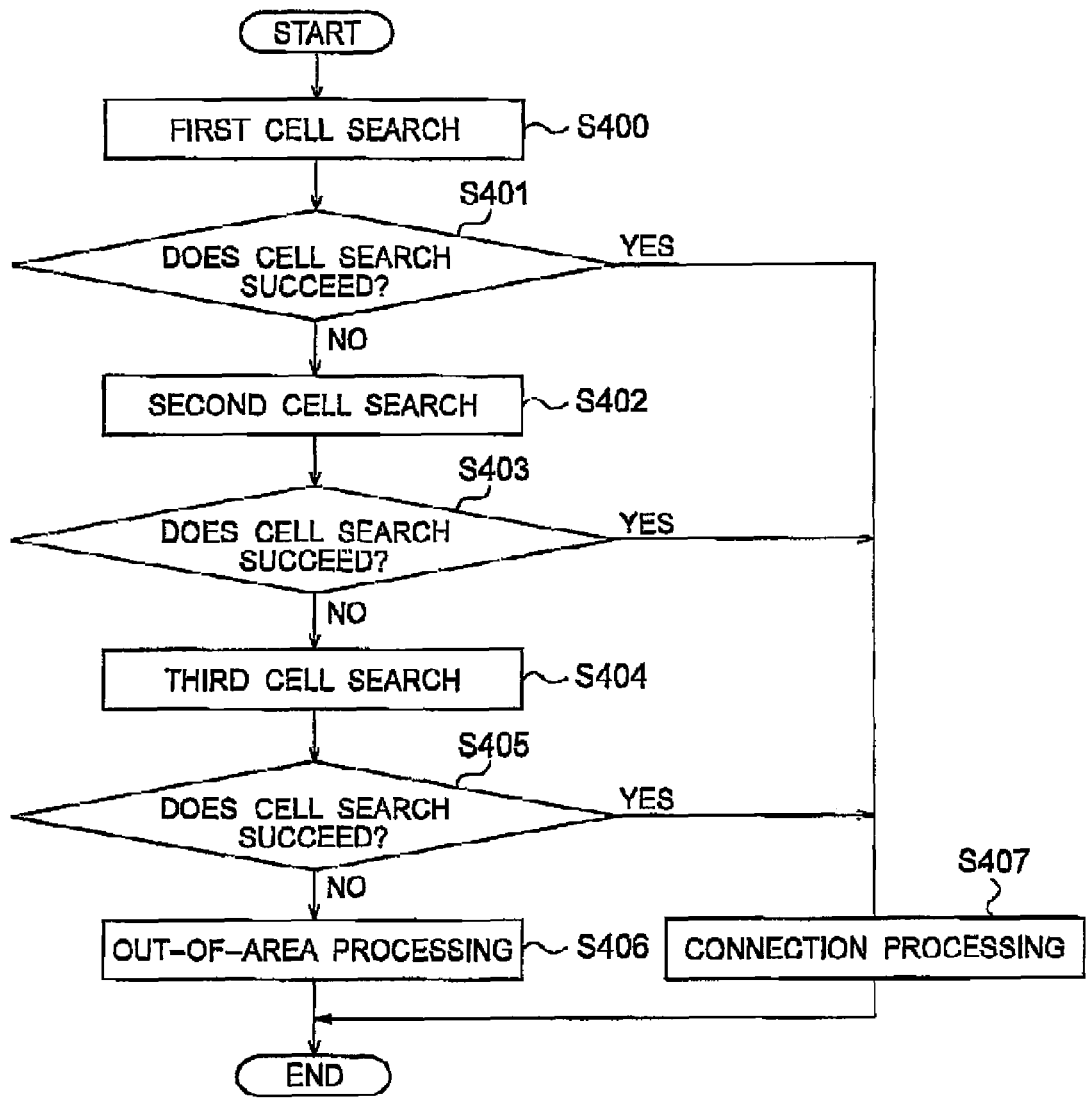

CELL SEARCH METHOD AND BASE STATION

TECHNICAL FIELD

The present invention relates to a cell search method and a base station for a multiband radio communication system provided with a mobile station and a base station communicating with the mobile station.

BACKGROUND ART

In cell-to cell handover in a radio communication system, a mobile station receives a list of information on peripheral base stations (hereinafter called "peripheral base station list") from a base station in communication therewith. Then, the mobile station decides a cell (base station) to which the mobile station is to be handed over, by performing a cell search using the peripheral base station, list. Specifically, the mobile station searches out a base a station providing the largest received power of a base station reference signal (for example, a pilot signal) among base stations included in the peripheral base station list.

As a result the base station providing the largest received power of the base station reference signal is selected as a next connection target, that is, a handover destination base station. Meanwhile, when there is no base station providing received power of the base station reference signal which exceeds a threshold, the mobile station is subject to out-of-service processing.

The mobile station performs a cell search on all the base stations included in the peripheral base station list. Thus, time required for a cell search increases in proportion to the number or base stations included in the peripheral base station list.

Accordingly, the number of base stations included in the peripheral base station list is set to be small to some extent. For example, the peripheral base station list held by a base station includes information on other base stations within an area where base station reference signals transmitted from the base station can be received at a predetermined received power (for example, around –20 dB).

When the mobile station movements at a high speed, a movement range of the mobile station per unit time is large. Hence, it is desirable to increase the number of base stations included in the peripheral base station list. However, the increase in the number of base stations included in the peripheral base station list increases time required for a cell search. This time increase may cause a failure to keep up with the movement speed, or increase power consumption of the mobile station.

Against such a problem, an approach is proposed in which a cell size of a handover destination base station (an area covered by a base station) is selected depending on the movement speed of the mobile station (see Patent Document 1). Specifically, a mobile station moving at a high speed is handed, over to a base station with a large cell size, while a mobile station moving at a low speed is handed over to a base station with a small cell size.

Meanwhile, a multiband radio communication system is known as a radio communication system using multiple frequency bands. In multiband radio communications, frequency bands are spaced from one another so as to have different propagation and diffraction characteristics.

In such multiband radio communication system, an approach is proposed in which a frequency may band to be used by a handover destination base station is selected depending on the movement speed of the mobile station (see Patent Document 2). To be more specific, a relatively preferable communication quality can be maintained with a low frequency band even when moving at a high speed. Thus, a high radio-frequency band is allocated to a mobile station moving at a high speed, while a low radio-frequency band is allocated to a mobile station moving at a low speed.

Patent Document 1: Japanese Patent No. 2669288
Patent Document 2: JP-A 2003-70055

DISCLOSURE OF THE INVENTION

However, neither of the approaches in Patent Documents 1 and 2 achieves a cell search control approach taking into consideration of both cell sizes and radio-frequency bands of base stations that are candidates for a handover destination base station. For this reason, even if a mobile, station is handed over to a base station with a large cell size due to its high movement speed, problems including deterioration in communication quality, forcible disconnection of communications, and a failure in receipt of an incoming signal may occur.

Meanwhile, even if a mobile station moving at a high speed is handed over to a base station with a low radio frequency, handover frequently occurs when the cell size of the base station is small. This increases the number of cell searches and forces very complicated processing on a network. In this way, appropriate base stations may not be sufficiently included in a peripheral base station list in Patent Documents 1 and 2.

Further, in Patent Documents 1 and 2, consideration is not given to the number of base stations included in the peripheral base station list. Too large a number of base stations included in the peripheral base station list causes problems of increasing time required for a cell search and power consumption of the mobile station. On the other hand, too small a number of base stations included in the peripheral base station list reduces the time required for a cell search, but increases a possibility that appropriate base stations are not sufficiently included in the peripheral base station list.

In view of the problems described above, an object of the present invention is to provide a cell search method and a base station for a multiband radio communication system, which are capable of notifying a mobile station of a base station list including base stations appropriate as candidates for a handover destination hasp station, as many as possible.

To achieve the above object, a first characteristic of the present invention is a cell search method for a multiband radio communication system provided with a mobile station and multiple base stations. The method includes the steps of: classifying base station information into multiple first categories on the basis of a cell size of each base station, the base station information being information on the base stations; classifying the base station information into multiple second categories on the basis of a radio-frequency band of each base station; associating movement speeds with the respective first categories and with the respective second categories; acquiring a movement speed of the mobile station; selecting at least one of the first categories and at least one of the second categories on the basis of the acquired movement speed and the associations respectively between the movement speeds and the first and second categories; creating a base station list on the basis of base station information which belongs to the selected first category and base station information which belongs to the selected second category, the base station list being to be notified to the mobile station; notifying the mobile station of the base station list; and causing the mobile station to perform a cell search on the basis of the notified base station list.

Here, "base station information" denotes, for example, identification information (ID) of a base station. A "cell size" denotes a size of a cell formed by each base station, and is defined by a cell coverage, an area, segment, or the like. An "area segment" denotes a type of an area where each base station is installed. A smaller cell coverage is set for an area with a larger number of users, while a larger cell coverage is set for an area with a smaller number of users.

According to such characteristic, a notification of a peripheral base station list is possible in consideration of both cell sizes and frequency bands to be used of base stations at the same time. Thus, the base station can notify the mobile station of a peripheral base station list including base stations appropriate as candidates for a handover destination base station, as many as possible.

A second characteristic thereof is characterised in that, in the cell search method according to the first characteristic, in the creating step, base station information on a predetermined number of base stations is extended from the base station information which belongs to the selected first category and the base station information which belongs to the selected second category, and the base station list is created on the basis of the extracted base station information.

According to such characteristic, the predetermined number of base station information pieces is extracted from the base station information pieces which belong to the selected first and second categories. Thereby, an increase in time required for the mobile station to perform a cell search can be avoided.

A third characteristic thereof is characterised in that, in the cell search method according to the second characteristic, in the creating step, the base station information which belongs to the second category is extracted preferentially over the base station information which belongs to the first category.

According to such characteristic, a stable communication quality can be provided to a mobile station moving at a high speed by giving priority to the category based on radio-frequency bands of the base stations in the above-described creating step.

A fourth characteristic thereof is characterised in that, in the cell search method according to the second characteristic, in the creating stop, base station information on a base station with larger received power from a base station currently in communication with the mobile station is preferentially extruded from the base station information which belongs to the selected first and second categories.

According to such characteristic, base station information pieces are extracted while priority is given to base station information on a base station with larger received power from a base station in communication with the mobile station. This can increase the probability of the mobile station succeeding in a cell search.

A fifth characteristic thereof is characterized in that, in the cell search method according to the first characteristic, in the selecting step, the first and second categories corresponding to the acquired movement speed are selected on the basis of first association information associating the respective first categories with movement speed ranges of the mobile station and second association information associating the respective second categories with the movement speed ranges, and the method further includes the step of changing the movement speed range to another one depending on a state of the mobile station. The "state of the mobile station" denotes, for example, a movement speed distribution of the mobile station, or residence time of the mobile a station in the cell.

According to such characteristic, the movement speed range (movement speed threshold) is changed depending on a state of the mobile station. Thereby, detailed cell search control can be achieved.

A sixth characteristic thereof is, in the cell search method according to the first characteristic, characterised by further including the step of reclassifying the base station information into the first categories depending on traffic loads of the respective base stations.

According to such characteristic, since cell sizes vary in accordance with traffic loads of base stations, base station information on multiple other base stations is reclassified into multiple first categories. Thereby, the base station can notify the mobile station of a peripheral base station list including base stations appropriate as candidates for a handover destination base station, as many as possible.

A seventh characteristic thereof is characterised in that, in the cell search method according to any one of the first to sixth characteristics, the step of performing includes the steps of: performing a first cell search by using the base station information which belongs to the second category; and when the first cell search fails, performing a second cell search by using the base station information which belongs to the first category.

According to such characteristic, a preferable communication quality can be maintained for a mobile station moving at a high speed by giving priority to performing the cell search by using the base station information which belongs to the second category. Further, the mobile station performs the cell search multiple times step by step, thus reducing the probability of the mobile station being subject to out-of-area processing due to failure in the cell search.

An eighth characteristic of the present invention is a base station employed in a multiband radio communication system. The base station includes: an associating unit configured to classify base station information, which is information on multiple different base stations, into multiple first categories on the basis of a cell size of each of the base stations, to classify the base station information into multiple second categories on the basis of a radio-frequency band of each of the base stations, and to associate movement speeds of a mobile station with the respective first categories and with the respective second categories; a selector configured to acquire a movement speed of the mobile station, and to select at least one of the multiple first categories and at least one of the multiple second categories on the basis of the acquired movement speed and the associations between the movement speeds of the mobile station and the respective first and second categories; a creator configured to create a base station list on the basis of information on different base stations which belong to the selected first and second categories, the base station list being to be notified to the mobile station; and a notifying unit configured to notify the mobile station of the base station list.

According to such characteristic, the base station can notify the mobile station of a peripheral base station list including base stations appropriate as candidates for a handover destination base station, as many as possible. Further, an increase in time required for the mobile station to perform a cell search can toe avoided.

BRIEF DESCRIPTION OF THE DRAWINGS

FIG. 3 is a table showing an example of peripheral base station information according to the first embodiment of the present invention.

FIG. 6 is a view showing an example of a peripheral base station list to be notified to a mobile station from the base station, according to the first embodiment of the present invention.

FIG. 7 is a flowchart showing an outline of a cell search method according to the first embodiment of the present invention.

FIG. 10 is a flowchart showing a flow example of cell search processing performed by the mobile station according to the first embodiment of the present invention.

BEST MODES FOR CARRYING OUT THE INVENTION

Figure 1A:
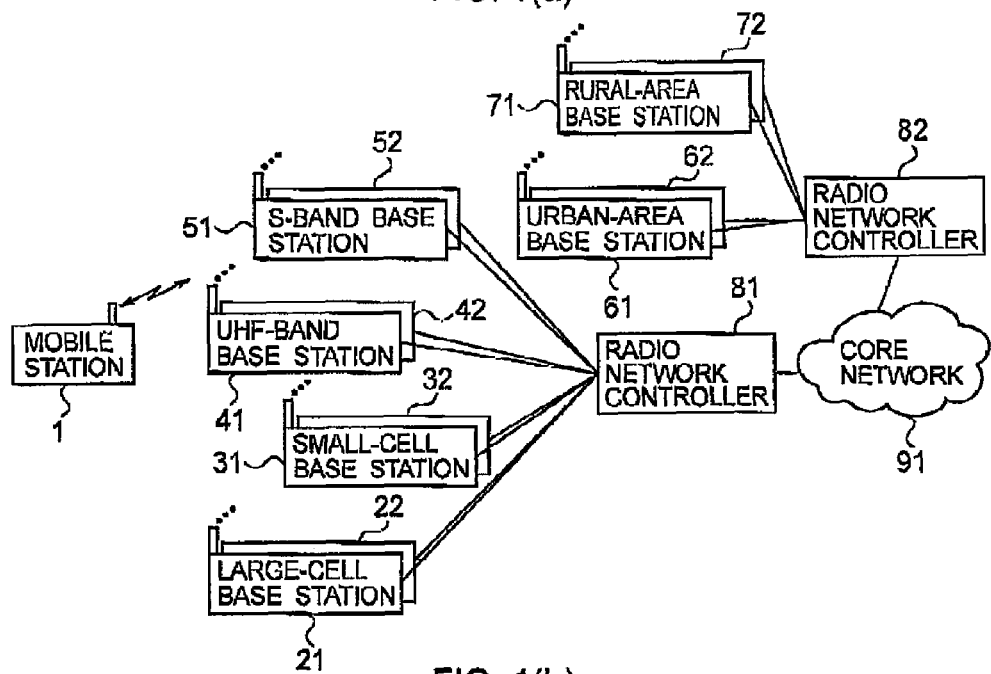
FIG. 1 is an overall configuration view of a radio communication system according to a first embodiment of the present invention.

Next, a description will be given of first and second embodiments of the present invention with reference to the drawings, in the following description of the drawings in the first and second embodiments, the same or similar parts will be denoted by the same or similar reference numerals.

First Embodiment (Overall configuration Example of Radio Communication System)

First, a description will be given of an overall configuration example of a radio communication system according to this embodiment. The radio communication system according to this embodiment is configured as a multiband radio communication system in which multiple radio-frequency bands are used. In such multiband radio communication system, frequency bands are spaced from one another so as to have different propagation and diffraction characteristics. Note that, frequency bands may have different transmission methods (for example, CDDMA, TDMA, and OFDMA), and base stations may use multiple radio-frequency bands.

FIG. 1(a) is a view showing the overall configuration example of the radio communication system according to this embodiment. The radio communication system shown in FIG. 1(a) includes: a mobile station 1; large-cell (macro-cell) base stations 21, 22 . . . ; small cell (micro-cell) base stations 31, 32 . . . ; UHF-band base stations 41, 42 . . . ; S-band base stations 51, 52 . . . ; urban-area base stations 61, 62 . . . ; rural-area base stations 71, 72 . . . ; radio network controllers (RNC) 81 and 82; and a core network 91.

The large-cell base stations 21, 22 . . . are base stations each having a set value of a cell radius that exceeds a predetermined value. The small-cell base stations 31, 32 . . . are base station each having the set value of the cell radius that is the predetermined value or smaller.

The UHF-band base stations 41, 42 . . . are base stations each using a radio frequency of around 800 MHz (UHF band). The S-band base stations 51, 52 . . . are base stations each using a radio frequency of around 2.5 GHz (S band).

The urban-area base stations 61, 62 . . . are base stations installed in an urban area. The rural-area base stations 71, 72 . . . are base stations installed in a rural area. The cell coverage is set small in the urban area where there are a large number of users. By contrast, the cell coverage is set large in the rural area where there are a small, number of users.

The radio network controllers 81 and 82 each serve as a higher-level device of the base stations, and perform management on radio resources to be used by the base stations, and other operations. The core network 91 is a network for performing position control, call control, and service control in a mobile communication system. The core network 91 is formed of, for example, an ATM exchange network, a packet exchange network, a router network, and the like.

Figure 1B:
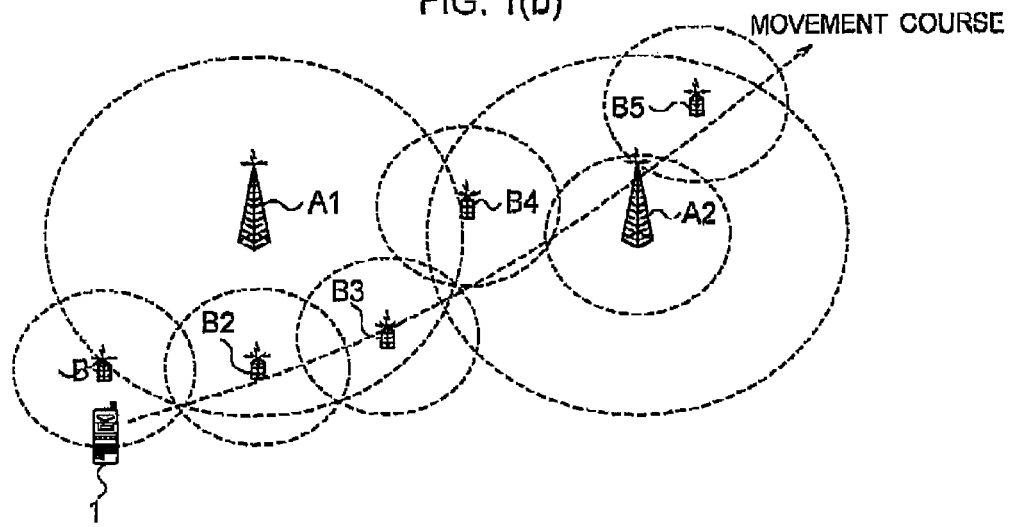

In such radio communication system in which there are various radio-frequency bands and various cell sizes mixed together, base stations with various radio frequencies and various cell sizes are present in the movement course of the mobile station 1, as shown in FIG. 1(b). Hence, a cell search method is needed in which both the radio frequencies and cell sizes are taken into consideration.

Here, a base station A1 in FIG. 1(b) corresponds to any one of the large-cell base stations 21, 22 . . . , the UHF-band base stations 41, 42 . . . , and the rural-area base stations 71, 72, . . . . A base station A2 is configured as a dual band base station capable of using two radio-frequency bands. Base stations B1, B2, B3, B4 and B5 each correspond to any one of the small-cell base stations 31, 32 . . . , the S-band base stations 51, 52 . . . , and the urban-area base stations 61, 62 . . . .

(Configuration Example of Base Station)

Figure 2:
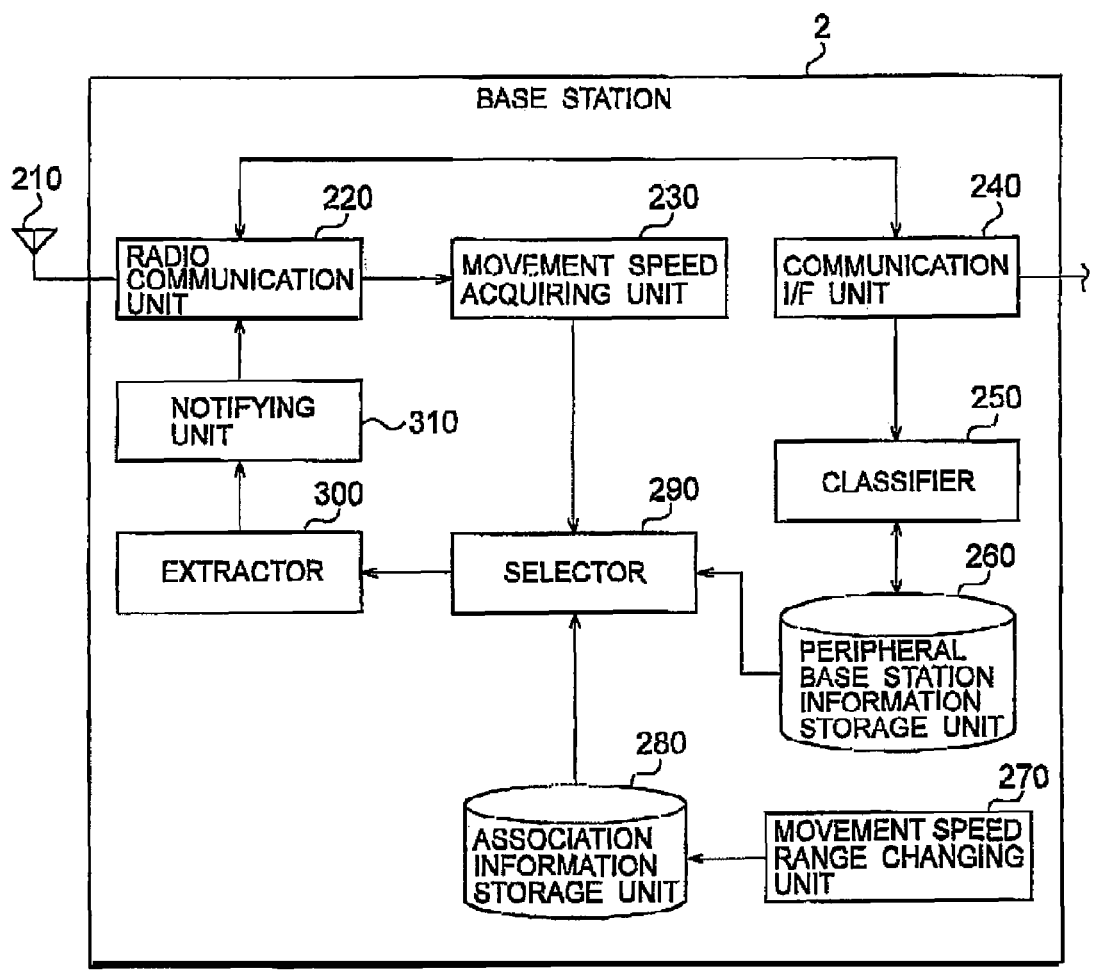
FIG. 2 is a functional block diagram showing a configuration example of a base station according to the first embodiment of the present invention.

Next, a description will be given of a configuration example of a base station according to this embodiment. FIG. 2 is a functional block diagram showing a configuration example of a base station 2 according to this embodiment.

The base station 2 includes: an antenna 210; a radio communication unit 220; a movement speed acquiring unit 230; a communication interface unit (hereinafter "communication I/F unit") 240; a classifier 250; a peripheral base station information storage unit 260; a movement speed range changing unit 270; an association information storage unit 280; a selector 290; an extractor 300; and a notifying unit 310.

The radio communication unit 220 performs radio communications with the mobile station 1 via the antenna 210. The communication I/F unit 240 performs communications with a higher-level network device (for example, the radio network controllers 81 and 82 in FIG. 1).

The classifier 250 classifies, for example, information on peripheral base stations (hereinafter referred to as "peripheral base station information") into multiple categories, the information notified by the higher-level network device via the communication I/F unit 240. The "peripheral base stations" denote, for example, base stations capable of receiving base station reference signals transmitted from the base station 2 at a constant received power (for example, around −20 dB) or more.

Specifically, based on a cell radius, the classifier 250 classifies the peripheral base station information into multiple categories of cell coverages. Based on a radio-frequency band, the classifier 250 classifies the peripheral base station information into multiple categories of frequency bands. Based on an area segment, the classifier 250 classifies the peripheral base station information into multiple categories of areas.

As an example, the multiple categories of cell coverages include: a "cell coverage category 1" where the cell radius is less than 500 m; a "cell coverage category 2" where the cell radius is 500 m to 1000 m; and a "cell coverage category 3" where the cell radius is 1000 m to 3000 m.

In addition, the multiple categories of frequency hands include: a "frequency band category 1" indicating a UNII band (around 5.5 GHz); a "frequency band category 2" indicating an S band; and a "frequency band category 3" indicating a UHF band.

Further, the multiple categories of areas include: an "area category 1" indicating a dense urban area; and an "area category 2" indicating an urban area. The peripheral base station information storage unit 260 stores the peripheral base station information classified by the classifier 250.

The association information storage unit 280 stores therein in advance cell coverage association information associating cell coverage categories with ranges of a movement speed of the mobile station 1 (hereinafter referred to as "movement speed ranges"). The association information storage unit 280 stores therein in advance frequency band association information associating frequency band categories with the movement speed ranges. The association information storage unit 280 stores therein in advance area segment association information associating area categories with the movement speed ranges. Here, an upper limit of each movement speed range is called a "movement speed threshold."

In the cell coverage association information, a category with a large cell radius is associated with a high movement speed range; a category with a small cell radius is associated with a low movement speed range.

In the frequency band association information, a category with a high frequency band is associated with a low movement speed range; a category with a low frequency band is associated with a high movement speed range.

In the area segment association information, a category of the urban area is associated with a low movement speed range; a category of a rural area is associated with a high movement speed range.

The movement speed acquiring unit 230 acquires a movement speed of the mobile station 1. The following approach (1) or (2) can be used as a method of acquiring the movement speed of the mobile station.

(1) When the mobile station 1 is provided with a global positioning system (GPS), a gyroscope, and the like, the mobile station 1 measures its movement speed by using them, and then notifies the base station 2 of a result of the measurement.

(2) The base station 2 beforehand keeps a table in which Doppler frequencies are associated with movement speeds. The base station 2 estimates a Doppler frequency from a channel shift of a signal received from the mobile station 1, and then acquires a movement speed of the mobile station 1 by using the Doppler frequency thus estimated and the table described above.

The selector 290 selects a cell coverage category, a frequency band category, and an area category which correspond to the movement speed acquired by the movement speed acquiring unit 230, on the basis of the cell coverage association information, the frequency band association information, and the area segment association information which are stored in the association information storage unit 280.

As a result, acquired is: peripheral base station information which belongs to the cell coverage category selected by the selector 290; peripheral base station information which belongs to the frequency band category selected by the selector 290; and peripheral base station information which belongs to the area category selected by the selector 290.

The extractor 300 extracts a predetermined number (for example around 20 stations) of peripheral base station information, pieces from the peripheral base station information pieces acquired in the above-described manner. Here, the following approach (1) or (2) can be used as a method of extracting the predetermined number of peripheral base station information pieces, for example.

(1) The extractor 300 extracts the predetermined number of peripheral base station information pieces while giving priority to the peripheral base station information which belongs to the frequency band category, among the cell coverage category, the frequency band category, and the area category.

(2) The extractor 300 extracts the pieces of information on the predetermined number of bases stations in descending order of received power of the base station reference signal from the base station 2, among the peripheral base station information pieces which belong to the cell coverage category, the frequency band category, and the area category. The information on the base stations with large received power of the base station reference signal from the base station 2 is notified to the base station 2 by, for example, the higher-level network device.

The notifying unit 310 notifies the mobile station 1 of a peripheral base station list including the peripheral base station information extracted by the extractor 300 by using the radio communication unit 220.

The movement speed range changing unit 270 changes a movement speed range (movement speed thresholds) for each of the cell coverage association information pieces, the frequency band association information pieces, and the area segment association information pieces, depending on a state of the mobile station 1. The following approach (1) or (2) can be used as a method of changing the movement speed ranges, for example.

(1) The movement speed range changing unit 270 changes the movement speed range for each of the cell coverage association information pieces, the frequency band association information pieces, and the area segment association information pieces, depending on movement speed distribution of the mobile station 1. Specifically, the movement speed range changing unit 270 decreases the movement speed threshold when the incidence of movement of the mobile station 1 is high, and increases the movement speed threshold when the incidence of movement of the mobile station 1 is low.

(2) The movement speed range changing unit 270 changes the movement speed range for each of the cell coverage association information pieces, the frequency band association information pieces, and the area segment association information pieces, depending on residence time of the mobile station 1 in the cell of the base station 2. Specifically, the movement speed range changing unit 270 decreases the movement sped thresholds for the mobile station 1 with longer residence time.

(Example of Peripheral Base Station Information)

Next, a description will be given of an example of the peripheral base station information. FIG. 3 is a table showing the example of the peripheral base station information.

In the example of FIG. 3, identification information of a peripheral base station (hereinafter "base station ID"), the cell radius of the peripheral base station, and the area segment of the peripheral base station are associated with one another. For example, a base station ID "BS#1," a cell radius "600 m," a frequency band "2.5 GHz," and an area segment "urban area" are associated with one another. In this case, the base station ID "BS#1" is classified as the cell coverage category 2, as the frequency band category 2, and as the area category 2.

(Example of Association Information)

Next, a description will be given of an example of the cell coverage association information, the frequency band association information, and the area segment association information.

Figure 4A:
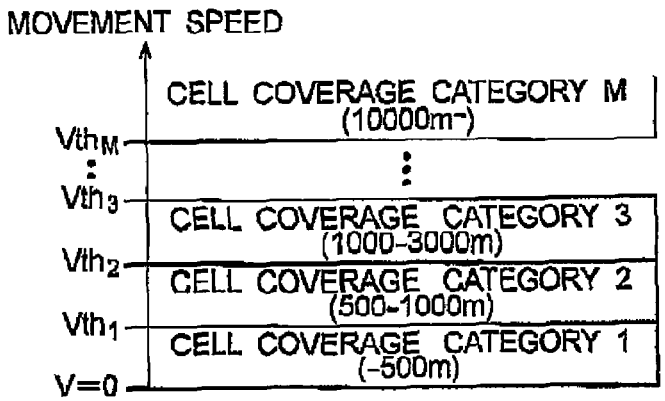
FIG. 4 is a view showing examples of cell coverage association information, frequency band association information, and area segment association information according to the first embodiment of the present invention.

FIG. 4(a) is a view showing an example of the cell coverage association information. In the example of FIG. 4(a), a cell coverage category 1 is associated with a movement speed range "0-$Vth_1$;" a cell coverage category 2 is associated with a movement speed range "$Vth_1$-$Vth_2$;" and a cell cover age category 3 is associated with a movement speed range "$Vth_2$-$Vth_3$."

Figure 4B:
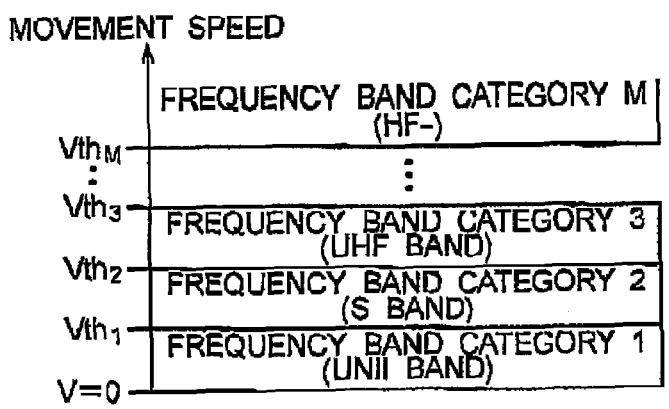

FIG. 4(b) is a view showing an example of the frequency hand association information, in the example of FIG. 4(b), a frequency band category 1 is associated with a movement speed range "0-$Vth_1$;" a frequency band category 2 is associated with a movement speed range "$Vth_1$-$Vth_2$;" and a frequency band category 3 is associated with a movement speed range "$Vth_2$-$Vth_3$."

Figure 4C:
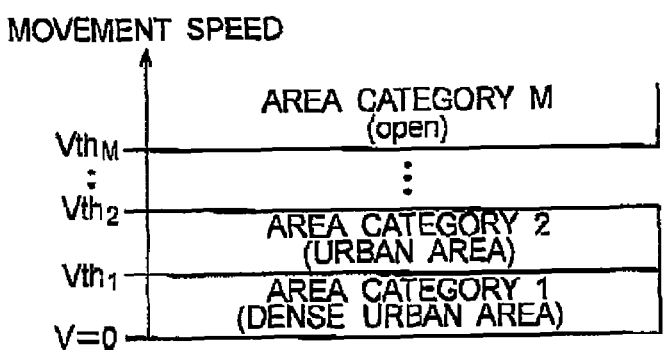

FIG. 4(c) is a view showing an example of the area segment association information. In the example of FIG. 4(c), an area category 1 is associated with a movement, speed range "0-$Vth_1$;" an area category 2 is associated with a movement speed range "$Vth_1$-$Vth_2$;" and an area category 3 is associated with a movement speed range "$Vth_1$-$Vth_3$."

Figure 5:
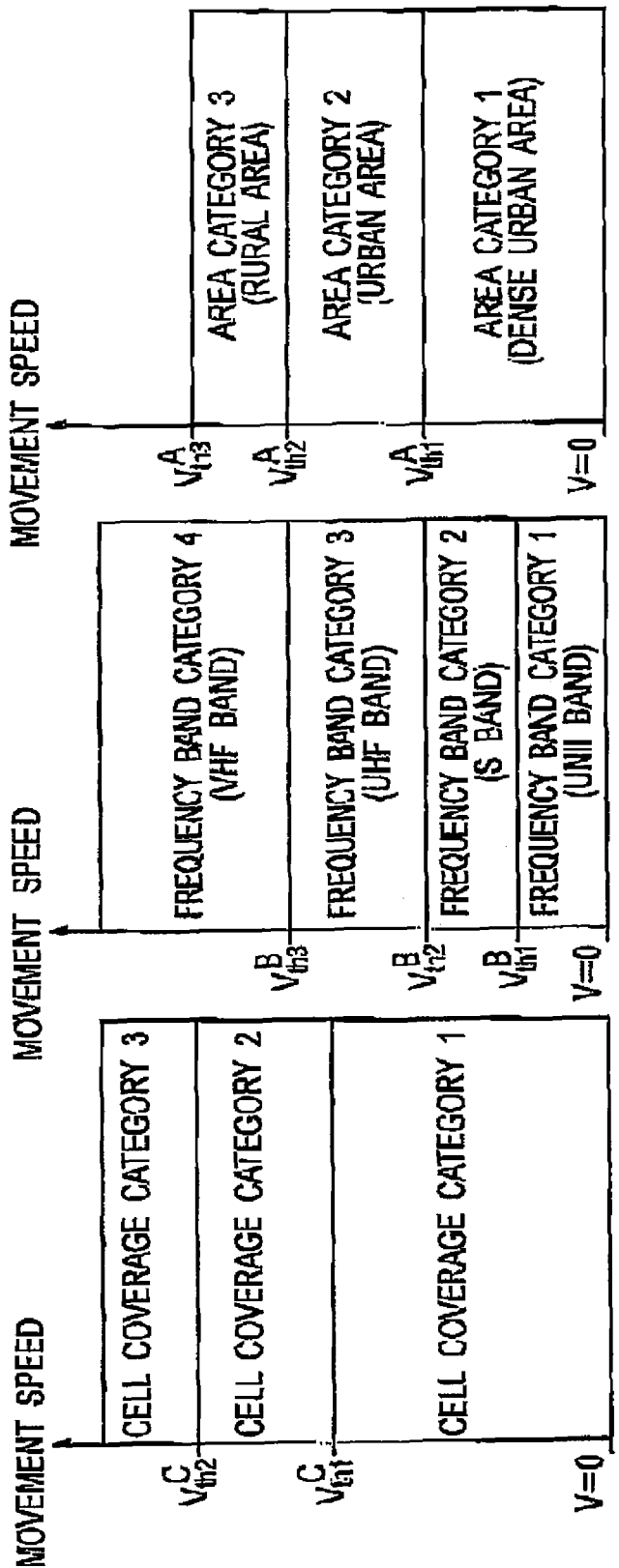
FIG. 5 is an example of setting movement speed ranges for cell coverage categories, frequency band categories, and area categories, according to the first embodiment of the present invention.

As described above, the movement speed range changing unit 270 functions to change a movement speed range (movement speed threshold). For this reason, the movement speed ranges set for the cell coverage categories, the frequency band categories, and the area categories may be uneven in some cases, as shown in FIG. 5.

(Example of Peripheral Base Station List)

Next, a description will be given of an example of a peripheral base station list to be notified to the mobile station 1. FIG. 6 is a view showing the example of the peripheral base station list to be notified to the mobile station 1 from the base station 2.

As shown in FIG. 6, the mobile station 1 receives a peripheral, base station list from the base station 2 in communication therewith. In the example in FIG. 6, the base station 2 notifies the mobile station 1 of the peripheral base station list combining peripheral base station information which belongs to the cell coverage category 2, peripheral base station information which belongs to the frequency band category 3, and peripheral base station information which belongs to the area category 2.

The mobile station 1 determines a handover destination base station by performing a cell search using the peripheral base station list. To be more specific, the mobile station 1 selects a handover destination base station by searching out a base station with the largest received power of the base station reference signal, among the peripheral base station information pieces (base station IDs) included in the peripheral base station list.

When performing a cell search, for example, the mobile station 1 performs a first cell search by using the peripheral base station information which belongs to the frequency band category. The mobile station 1 gives priority to the cell search using the peripheral base station information which belongs to the frequency band category. Thereby, relative preferable communication quality can be maintained even if the movement speed of the mobile station 1 is high.

Then, when the first cell search fails, the mobile station 1 performs a second cell search by using the peripheral base station information which belongs to the cell coverage category. Further, when the second cell search falls, the mobile station 1 performs a third cell search by using the peripheral base station information which belongs to the area category. In this manner, the mobile station 1 performs the cell search multiple times step by step, thus reducing the probability of the mobile station 1 being subject to out-of-area processing due to failure in the cell search.

(Outline of Cell Search Method)

Next, a description will be given of an outline of the cell search method according to this embodiment. FIG. 7 is a flowchart showing the outline of the cell search method according to this embodiment.

In Step S101, the movement speed acquiring unit 230 acquires the movement speed of the mobile station 1.

In step S102, the selector 290 selects a cell coverage category, a frequency band category, and an area category which correspond to the movement speed acquired in step S101, on the basis of the cell coverage association information, the frequency band association information, and the area segment association information which are stored in the association information storage unit 200.

In Step S103, the extractor 300 extracts a predetermined number of peripheral base station information pieces from peripheral base station information pieces which belong to the categories selected in Step S102.

In Step S104, the notifying unit 310 notifies the mobile station 1 of a peripheral base station list including the peripheral base station information pieces extracted in Step S103.

In Step S105, the mobile station 1 performs a cell search by using the peripheral base station list notified in Step S104.

(Flow Example of Update Processing of Peripheral Base Station Information)

Figure 8A:
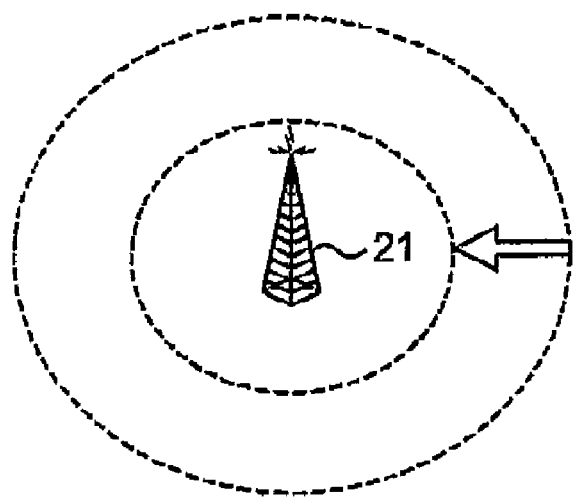
FIG. 8 is a view for explaining an update processing of the peripheral base station informal-inn according to the first embodiment of the present, invention.

Next, a description will be given of a flow example of update processing of the peripheral base station information stored in the peripheral base station information storage unit 260 in FIG. 2. As shown in FIG. 8(a), the cell size of the base station 21 varies in accordance with its traffic accommodation ratio, and therefore association between the peripheral base station information and the cell coverage category needs to be updated.

Figure 8B:
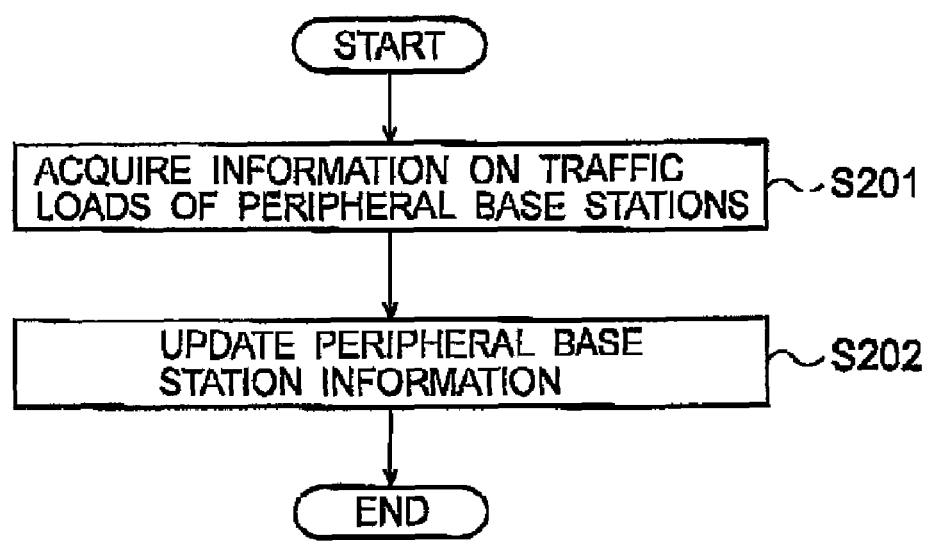

FIG. 8(b) is a flowchart showing the flow example of the update processing of the peripheral base station information.

In Step S201, the classifier 250 acquires information on traffic loads of peripheral base stations notified by the higher-level network device via the communication I/F unit 240.

In Step S202, the classifier 250 reclassifies the peripheral base station information into multiple cell coverage categories, on the basis of the information on the traffic loads of the peripheral base stations acquired in Step S201.

(Flow Example of Change Processing of Movement Speed Range)

Figure 9:
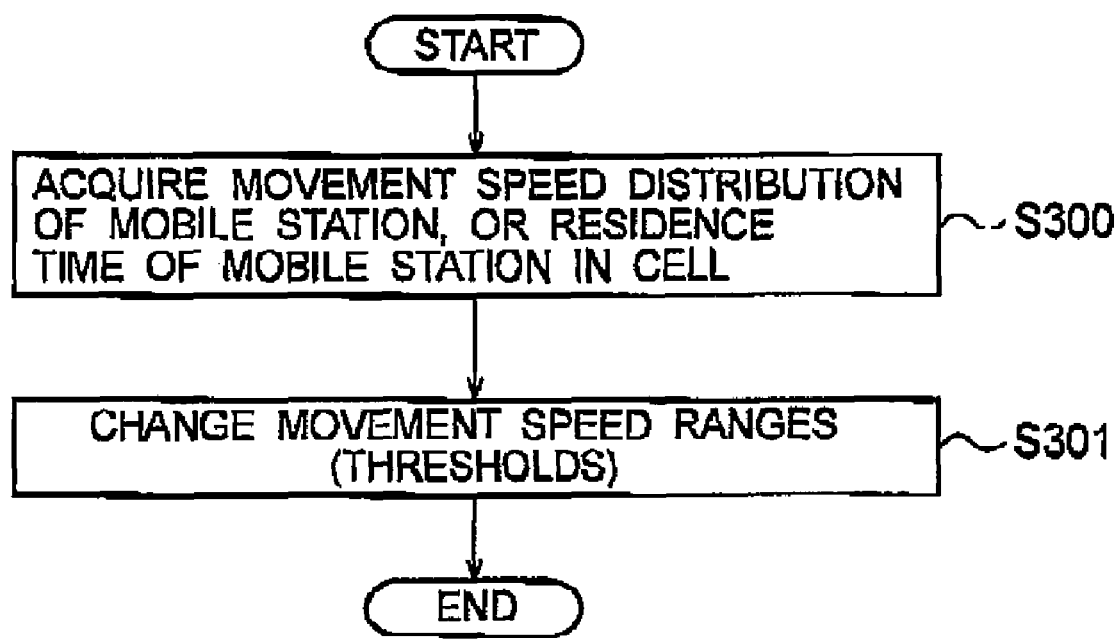
FIG. 9 is a flowchart showing a flow example of change processing of a movement speed range according to the first embodiment of the present invention.

Next, a description will be given of a flow example of change processing of a movement speed range performed by the movement speed range changing unit 270. FIG. 9 is a flowchart showing the flow example of the change processing of a movement speed range.

In Step S300, the movement speed range changing unit 270 acquires a movement speed distribution of the mobile station 1, or residence time of the mobile station 1 in the cell, information on the movement speed distribution or the residence time is notified to the base station 2 via, for example, the higher-level network device.

In Step S301, the movement speed range changing unit 270 changes a movement speed range (a movement speed threshold) for each of the cell coverage association information pieces, the frequency band association information pieces, and the area segment association information pieces, in accordance with the information on the movement speed distribution or the residence time acquired in Step S300.

(Flow Examples of Cell Search Processing Performed by Mobile Station)

Next, a description will be given of a flow example of cell search processing performed by the mobile station 1. FIG. 10 is a flowchart showing the flow example of the cell search processing performed by the mobile station 1.

in Step S400, the mobile station 1 performs a first cell search by using the peripheral base station information which belongs to the frequency band category.

In Step S401, the mobile station 1 determines whether or not the second cell search succeeds. When the mobile station 1 succeeds in the first cell search, the process proceeds to the processing in Step S407. On the other hand, when the mobile station 1 fails in the first cell search, the process proceeds to the processing in Step 402.

In step S402, the mobile station 1 performs a second cell search by using the peripheral base station information which belongs to the cell coverage category.

In Step S403, the mobile station 1 determines whether or not the second cell search succeeds. When the mobile station 1 succeeds in the second cell search, the process proceeds to the processing in Step S407. On the other hand, when the mobile station 1 fails in the second cell search, the process proceeds to the processing in Step 404.

In Step S404, the mobile station 1 performs a third cell search by using the peripheral base station information which belongs to the area category.

In Step S405, the mobile station 1 determines whether or not the third cell search succeeds. When the mobile station 1 succeeds in the third cell search, the process proceeds to the processing in Step S407. On the other hand, when the mobile station 1 fails in the third cell search, the process proceeds to the processing in Step 406.

In Step S406, the mobile station 1 is subject to out-of-area processing since no base station exists to which the mobile station 1 can be handed over.

In Step S407, the mobile station 1 is handed over to the base station thus searched out through the cell search.

(Operation and Effect)

As has been described in detail, according to this embodiment, a peripheral base station list is notified to the mobile station 1 in consideration of both cell sizes (cell radius and area segments) and frequently bands to be used of base stations at the same time. Thus, the base station 2 can notify the mobile station 1 of a peripheral base station list including base stations appropriate as candidates for a handover destination base station, as many as possible. Further, the base station 2 extracts a predetermined number of peripheral base station information pieces, so that time required for the mobile station 1 to perform a cell search can be prevented from increasing.

Moreover, in a process of extracting a predetermined number of peripheral base station information pieces, the base station 2 gives priority to categories based on radio-frequency bands of base stations. Thereby, stable communication quality can be provided to mobile stations moving at a high speed. Alternatively, in the process of extracting a predetermined number of peripheral base station information pieces, the base station 2 extracts peripheral base station information while giving priority to base stations with large received power from the base station 2. This increases the probability of the mobile station 1 succeeding in a cell search.

Further, according to this embodiment, movement speed ranges (movement speed thresholds) are changed in accordance with a movement speed distribution of the mobile station 1 and residence time of the mobile station 1 in a cell. This enables a further detailed cell search control.

Furthermore, according to this embodiment, the base station 2 reclassifies peripheral base station information into multiple first categories in accordance with traffic loads. Thereby, the base station 2 can notify the mobile station 1 of a peripheral base station list including base stations appropriate as candidates for a handover destination base station, as many us possible.

Second Embodiment

In a second embodiment of the present invention, a description will be given of a configuration in which an adaptive array antenna technique is employed in order to implement a special division multiple access (SDMA) technology. A radio communication system employing such adaptive array antenna technique includes a radio communication system compliant with iBurst (trademark) standard, for example. Note that, in the following second embodiment, differences from the first embodiment will be mainly described and a repeated description thereof will be omitted.

Figure 11A:
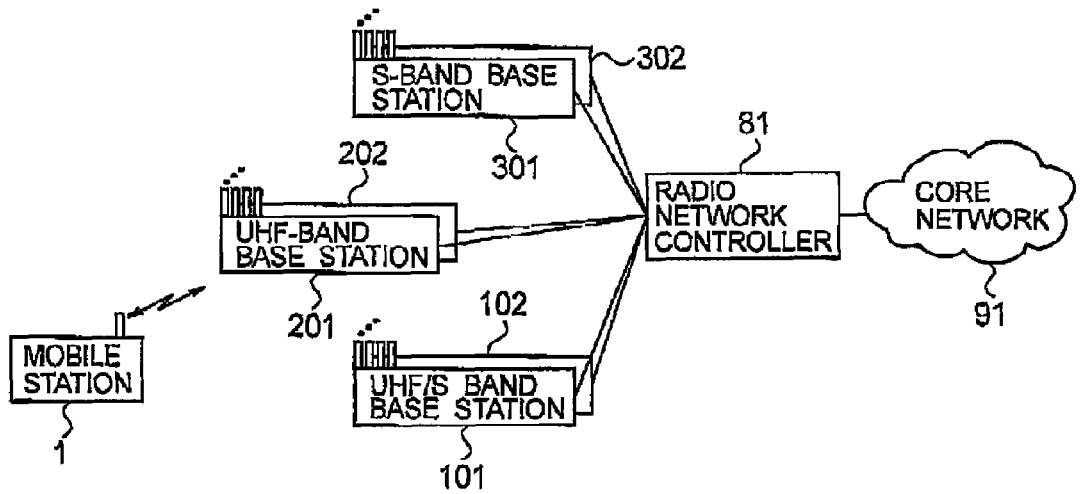
FIG. 11 is a configuration example of a radio communication system according to this embodiment according to a second embodiment of the present invention.
Figure 11B:
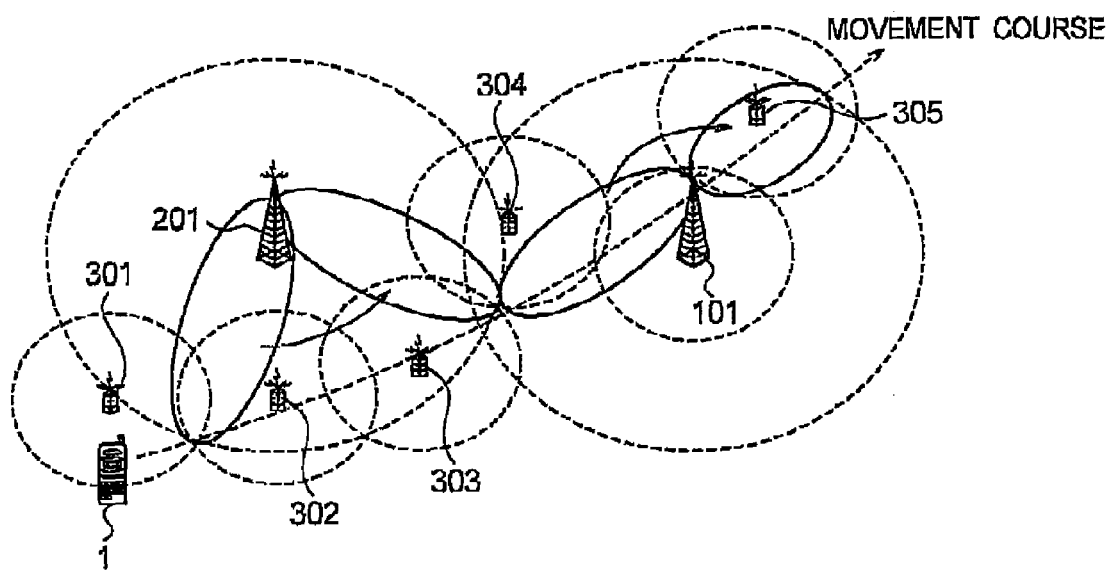

FIG. 11(*a*) is a view showing an overall configuration example of a radio communication system according to this embodiment. The radio communication system shown in FIG. 11(*a*) includes: a mobile station 1; UHF-band and S-band dual-band base stations 101 and 102; UHF-band base stations 201 and 202; S-band base stations 301 and 302; a radio network controller 81; and a core network 91. The base stations shown in FIG. 11(*a*) each form a directivity pattern appropriately so as to transmit and receive a radio wave to and from a mobile station located in a certain direction, the directivity pattern formed by using an adaptive array antenna having multiple antennas.

FIG. 11(*b*) shows a case where the mobile station 1 receives signals transmitted by the base stations using beamforming. In FIG. 11(*b*), the UHF-band base station 201, the UHF band and S-band dual-band base station 101, and the s-band base stations 301 and 302 and S-band base stations 303 and 304 are illustrated. Here, the UHF-band base station 201 may be a large-cell base station, and the S-band base stations 301, 302, 303 and 304 may be small-cell base stations.

With the adaptive array antenna technique, directivity beams transmitted by the base stations each track the movement of the mobile station 1. According to the cell search method described in the first embodiment, when the mobile station 1 moves at a high speed, base stations each having a cell large in size or base stations each using a low radio-frequency band are selected as candidates for a base station to which the mobile station 1 is to be handed over. Accordingly, deterioration of a signal due to a tracking error of the directivity beam can be prevented, thus improving a communication quality.

Figure 12A:
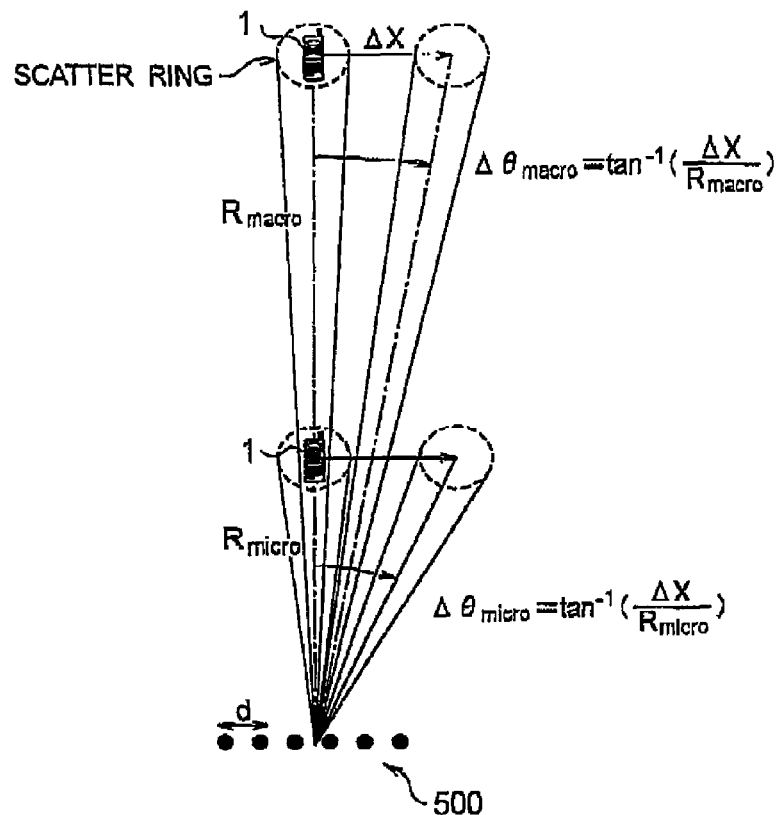
FIG. 12 is a view for explaining an operation of the radio communication system according to this embodiment according to the second embodiment of the present invention.
Figure 12B:
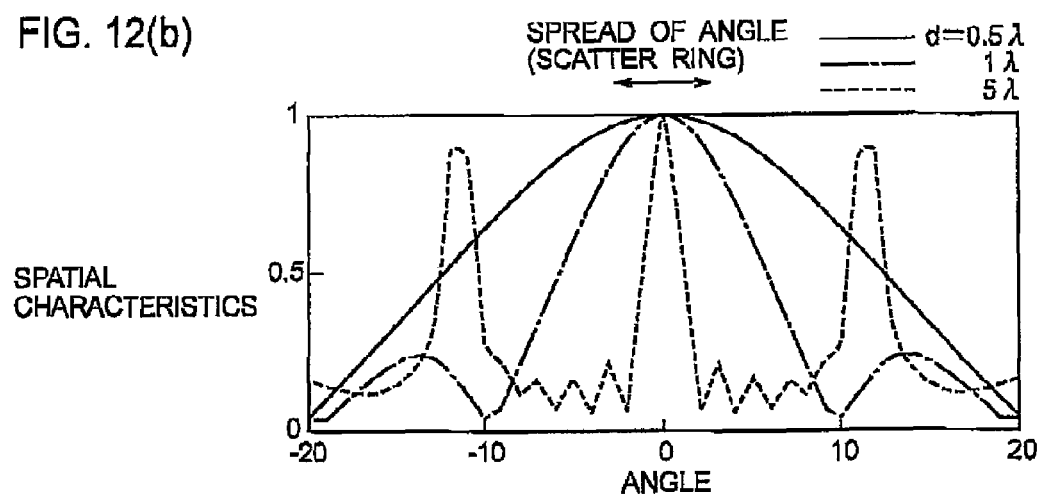

FIG. 12(*a*) is a view showing a relation of a distance, between the mobile station 1 and an array antenna 500 of the base station 2, and a rotational angle of a directivity beam, in FIG. 12(*a*), "Rmicro" denotes a distance therebetween defined when the mobile station 1 is accommodated in a small-cell base station, while "Rmacro" denotes a distance therebetween defined when the mobile station 1 is accommodated in a large-cell base station.

A rotational angle Δθmicro of the directivity beam in the small cell, which is defined when the mobile station 1 moves by a distance ΔX in the small cell, is larger than a rotational angle Δθmacro of the directivity beam in the large cell, which is defined when the mobile station 1 moves by the distance ΔX in the large cell. A larger relational angle is more likely to cause the tracking error; a higher movement speed of the mobile station 1 is further likely to cause the tracking error. Accordingly, in the radio communication system using the adaptive array antenna technique, the cell search method described above can bring about a further preferable effect.

Next, with reference to FIG. 12(*b*), a description will be given of a case where one array antenna is shared by multiple frequency bands. FIG. 12(*b*) is a graph showing spatial correlation (beam) characteristics of the array antenna 500 in FIG. 12(*a*) employing a linear arrangement of 6 elements, where an element distance d is set to 0.5λ, 1λ, or 5λ.

As shown in FIG. 12(*b*), spatial correlation characteristics vary in accordance with an element distance over wavelength ratio. In other words, when the element distance is constant, the spatial correlation characteristics vary in accordance with a used frequency band. Note that FIG. 6(*b*) shows a case where an array antenna with an element distance of 0.5λ at 500 MHz is designed to have dual bands at 1 GHz and 5 GHz without changing the antenna arrangement.

In the case of considering diffusion spread (scatter ring) at an angle of approximately 5° on the mobile station 1 side, the spatial characteristics with respect to the spread of angle is moderate at 500 MHz, thus making it relatively easy to track the movement of the mobile station 1. On the other hand, at 5 GHz hand, the width of the spatial characteristics has a half-value angle of approximately 1° or smaller, thus making it relatively difficult to track the movement of the mobile station 1.

According to the cell search method described above, when the mobile station 1 moves at a high speed, base stations each using a low radio-frequency band are selected as candidates for a base station to which the mobile station 1 is to be handed over. Thus, the cell search method can bring about a further preferable effect when one array antenna is shared by multiple frequency bands.

Other Embodiments

The present invention has been described above by the first and second embodiments. However, it should be understood that the description and drawings constituting one part of this disclosure do not limit the present invention. Various alternative embodiments, examples, and operational techniques will be apparent from this disclosure for those skilled in the art.

In the above-described second embodiment, an example of using the adaptive array antenna technique has been described. However, a configuration using other multiple antenna technique, such as Multiple input Multiple output (MIMO) may be employed.

In the above-described first and second embodiments, a description has been given of the case where the base station 2 executes the process of classifying the peripheral base station information into categories. However, the radio network controller or the core network may execute the process of classifying the peripheral base station information into categories.

Further, a description has been given of the cell search control method taking into consideration of a cell coverage, a frequency band and an area segment. However, the cell search control may be performed by using the frequency band and any one of the cell coverage and the area segment.

In this manner, it should be understood that the present invention includes various embodiments and the like not described herein. Accordingly, the present invention should be limited only by the inventive specified matters related to the scope of claims, which axe appropriate from this disclosure.

Note that, the entire content of Japanese Patent Application No. 2006-265799 (filed on Sep. 20, 2000) is incorporated herein by reference.

Industrial Applicability

As has been described, in a multiband radio communication system, the cell search method and the base station according to the present invention can provide the cell search method and the base station, capable of notifying a mobile station of a peripheral base station list including more base stations which are appropriate. Accordingly, they are useful in radio communications such as mobile communications.

The invention claimed is:

1. A cell search method for a multiband radio communication system provided with a mobile station and a plurality of base stations, the method comprising the steps of:
classifying base station information into a plurality of first categories on the basis of a cell size of each base station independently of frequency, the base station information being information on the base stations;
classifying the base station information into a plurality of second categories on the basis of a radio-frequency band of each base station independently of cell size;
associating movement speeds with the first categories independently of associating the movement speeds with the second categories;
acquiring a movement speed of the mobile station;
selecting at least one of the first categories and at least one of the second categories on the basis of the acquired movement speed independently of the base station selection and the associations respectively between the movement speeds and the first and second categories;
creating a base station list on the basis of base station information which belongs to the selected first category and base station information which belongs to the selected second category, the base station list being to be notified to the mobile station;
notifying the mobile station of the base station list; and
causing the mobile station to perform a cell search on the basis of the notified base station list.

2. The cell search method according to claim 1, wherein
in the creating step, base station information on a predetermined number of base stations is extracted from the base station information which belongs to the selected first category and the base station information which belongs to the selected second category, and the base station list is created on the basis of the extracted base station information.

3. The cell search method according to claim 2, wherein
in the creating step, the base station information which belongs to the second category is extracted preferentially over the base station information which belongs to the first category.

4. The cell search method according to claim 2, wherein
in the creating step, base station information on a base station with larger received power from a base station currently in communication with the mobile station is preferentially extracted from the base station information which belongs to the selected first and second categories.

5. The cell search method according to claim 1, wherein
in the selecting step, the first and second categories corresponding to the acquired movement speed are selected on the basis of first association information associating the respective first categories with movement speed ranges of the mobile station and second association information associating the respective second categories with the movement speed ranges,
the method further comprising the step of changing the movement speed range to another one depending on a state of the mobile station.

6. The cell search method according to claim 1, further comprising the step of reclassifying the base station information into the first categories depending on traffic loads of the respective base stations.

7. The cell search method according to any one of claims 1 to 6, wherein
the step of performing includes the steps of:
performing a first cell search by using the base station information which belongs to the second category; and
when the first cell search fails, performing a second cell search by using the base station information which belongs to the first category.

8. A base station employed in a multiband radio communication system, the base station comprising;
an associating unit configured to classify base station information, which is information on a plurality of different base stations, into a plurality of first categories on the basis of a cell size of each of the base stations independently of frequency,
to classify the base station information into a plurality of second categories on the basis of a radio-frequency band of each of the base stations independently of cell size, and
to associate movement speeds of a mobile station with the first categories independently of associating the movement speeds with the second categories;
a selector configured to acquire a movement speed of the mobile station, and
to select at least one of the plurality of first categories and at least one of the plurality of second categories on the basis of the acquired movement speed independently of the base station selection and the associations between the movement speeds of the mobile station and the respective first and second categories;
a creator configured to create a base station list on the basis of information on different base stations which belong to the selected first and second categories, the base station list being to be notified to the mobile station; and
a notifying unit configured to notify the mobile station of the base station list.

* * * * *